UNITED STATES PATENT OFFICE.

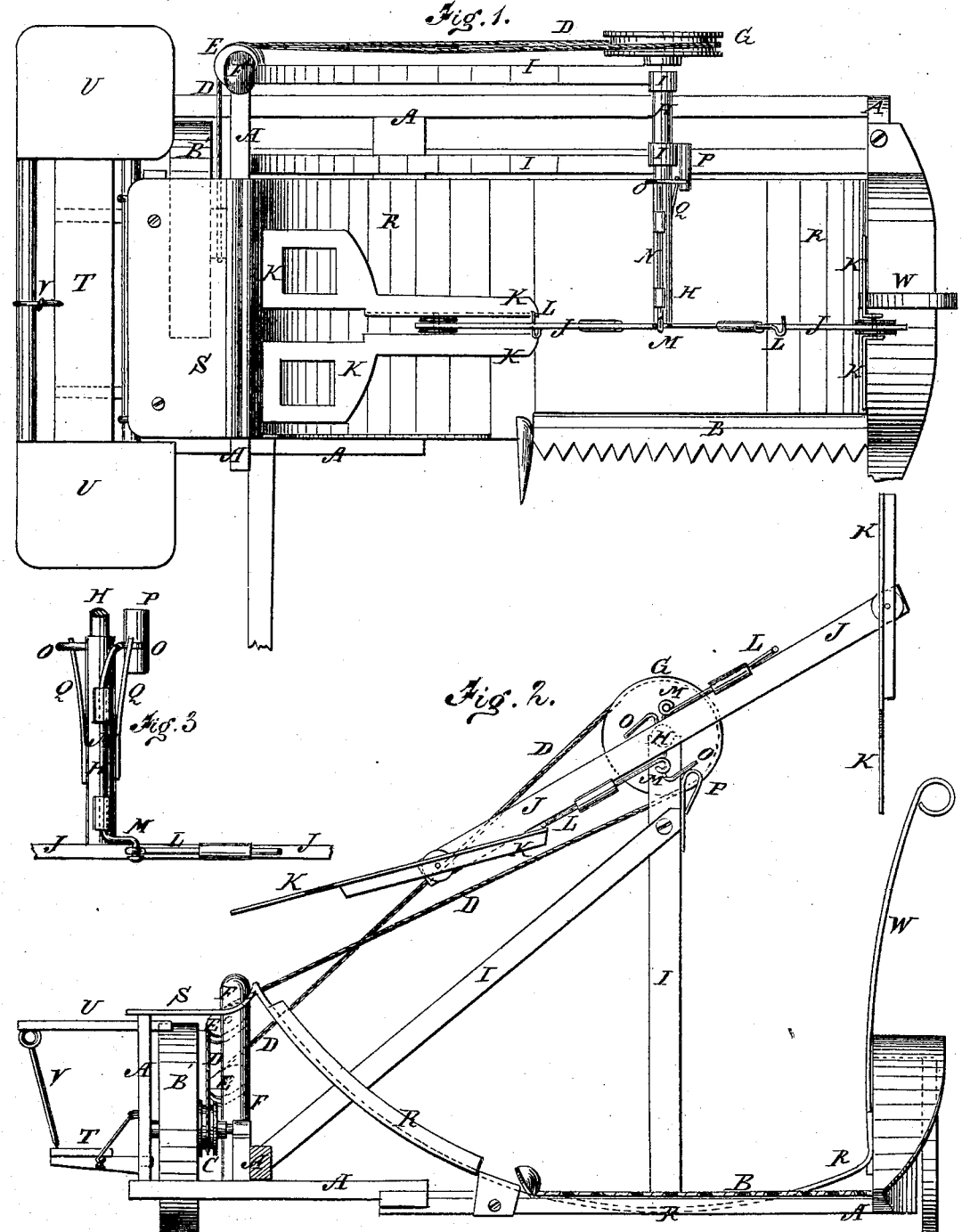

ERASMUS H. DONALDSON, OF STACEYVILLE, IOWA.

IMPROVEMENT IN HARVESTER-RAKES.

Specification forming part of Letters Patent No. 149,106, dated March 31, 1874; application filed January 10, 1874.

*To all whom it may concern:*

Be it known that I, ERASMUS H. DONALDSON, of Staceyville, in the county of Mitchell and State of Iowa, have invented a new and useful Improvement in Automatic Rake for Harvesters, of which the following is a specification:

Figure 1 is a top view of my improved device shown as applied to a harvester. Fig. 2 is a front view of the same. Fig. 3 is a detail view of the rake-trip.

Similar letters of reference indicate corresponding parts

A represents the frame-work of a harvester. B is the cutter-bar, which is constructed and operated in the ordinary way. B' is the drive-wheel, to the shaft of which is attached a pulley, C, around which passes a band or chain, D, which passes around guide-pulleys E, pivoted to a post, F, attached to the frame-work of the machine. From the guide-pulleys E the band or chain D passes around a pulley, G, attached to the rear end of the shaft H, which revolves in supports I, attached to the platform-frame A. To the forward end of the shaft H is rigidly attached a cross-bar, J, to the ends of which are pivoted the rakes K. Each of the rakes K is made in two parts or halves, which are placed upon the opposite sides of and pivoted to the end of the cross-bar J by a bolt, as shown in Figs. 1 and 2. L are rods, which slide longitudinally in keepers attached to the cross-bar J, and which have cross-heads formed upon or attached to their outer ends, which, when the said rods are pushed outward, catch upon the ends of the shanks of the parts of the rakes K, and hold said rakes extended while sweeping the grain across the platform. As the gavel is swept into the receiving-trough or upon the ground the rakes are released by the inward movement of the catch-rods L. The inner ends of the catch-rods L are pivoted to short cranks M, attached to or formed upon the forward ends of the rods N, which work in keepers attached to the shaft H, and upon the other or rear ends of which are formed inclined or cam arms O, which, as the shaft H revolves, strike against an arm-stop or cam, P, attached to the supports of the said shaft H, and thus withdraws the catch-rods L to release the rakes at the proper time. As the arms O slip from the arm P they are moved back into their former position, projecting the catch-rods L into position, to again receive and hold the rakes, by springs Q, attached to the shaft H, and which bear against the inclined arms O. R is the platform, which is curved into the arc of the circle, through which the rake-heads sweep. The outer end of the platform R starts a little above the level of the cutter-bar, passes a little below the said cutter-bar, and rises, at its inner end, above the drive-wheel B', and with its end is connected a trough, S, to receive the gavel from the rake, and from which it is taken by the binders. The binders stand upon the platform T, attached to the lower part of the frame-work of the machine, and they lay the gavels while being bound upon the tables U, which are hinged to the frame-work A, so that they may be turned up out of the way when not in use, and which are supported by a leg, V, which rests upon the platform T, or other convenient support. By detaching the receiving-trough S, and the platform T, and tables U, the gavels may be dropped from the upper end of the curved platform R (being made long enough to clear the wheel) to the ground. W is a guide attached to the outer end of the platform, to prevent the rakes from swinging outward, and to cause them to descend in proper position at the outer end of the platform R.

Having thus described my invention, what I claim as new, and desire to secure by Letters Patent, is—

1. The curved platform R, the swinging rakes K, the cross-bar J, the shaft H, the catch-rods L, the crank-rods M N, cam-arms O P, and the springs Q, in combination with the cutter-bar and frame-work of the machine, substantially as herein shown and described.

2. The combination of the guide W with the curved platform R and the rakes K, substantially as herein shown and described.

ERASMUS H. DONALDSON.

Witnesses:
 ORAN ORCUTT,
 H. J. ACKER.